United States Patent
Fan et al.

(10) Patent No.: US 12,556,124 B2
(45) Date of Patent: Feb. 17, 2026

(54) PROTECTION APPARATUS AND BRUSHLESS MOTOR SYSTEM

(71) Applicant: HUAWEI TECHNOLOGIES CO., LTD., Guangdong (CN)

(72) Inventors: Wingto Fan, Dongguan (CN); Weiliang Shu, Dongguan (CN); Yanding Liu, Dongguan (CN); Qitang Liu, Shenzhen (CN); Hongcheng You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 18/189,305

(22) Filed: Mar. 24, 2023

(65) Prior Publication Data

US 2023/0231506 A1    Jul. 20, 2023

Related U.S. Application Data

(63) Continuation of application No. PCT/CN2021/119247, filed on Sep. 18, 2021.

(30) Foreign Application Priority Data

Sep. 25, 2020 (CN) .......................... 202011027321.2

(51) Int. Cl.
*H02P 6/32* (2016.01)
*H01F 13/00* (2006.01)
(Continued)

(52) U.S. Cl.
CPC ......... *H02P 29/028* (2013.01); *H01F 13/006* (2013.01); *H02P 29/032* (2016.02); *H02P 2207/05* (2013.01)

(58) Field of Classification Search
CPC ........ H02P 29/032; H02P 29/025; H02P 3/22; H02P 6/32; H02P 29/028; H02P 2207/05;
(Continued)

(56) References Cited

U.S. PATENT DOCUMENTS

| | | | |
|---|---|---|---|
| 4,106,069 | A | 8/1978 | Trautner et al. |
| 4,594,632 | A | 6/1986 | Unnewehr |

(Continued)

FOREIGN PATENT DOCUMENTS

| | | |
|---|---|---|
| CN | 201690219 U | 12/2010 |
| CN | 204089656 U | 1/2015 |

(Continued)

OTHER PUBLICATIONS

CN204089656U_English_Machine_Translation_2015.*
(Continued)

*Primary Examiner* — Gabriel Agared

(57) ABSTRACT

A protection apparatus and a brushless motor system reduce costs of the brushless motor system and ensure normal operation of a brushless motor. The protection apparatus includes a demagnetization apparatus and a control apparatus. The demagnetization apparatus is configured to be bridged between a rectifier circuit and an excitation winding, and is configured to consume, when the brushless motor system is faulty, excess electric energy generated on the excitation winding. The control apparatus is configured to separately connect to an excitation power supply circuit and a controller; and is configured to detect electrical parameters of an input terminal and an output terminal of the excitation power supply circuit, and when determining that the electrical parameters exceed a preset threshold, generate an alarm to the controller and adjust the output electrical parameter of the excitation power supply circuit.

19 Claims, 8 Drawing Sheets

(51) Int. Cl.
*H02K 11/20* (2016.01)
*H02P 3/22* (2006.01)
*H02P 29/028* (2016.01)
*H02P 29/032* (2016.01)

(58) Field of Classification Search
CPC .... H02K 11/0094; H02K 11/20; H01F 13/006
USPC .................................................. 318/400.3
See application file for complete search history.

(56) References Cited

U.S. PATENT DOCUMENTS

| | | | | |
|---|---|---|---|---|
| 6,252,331 | B1* | 6/2001 | Mildice | H02P 25/024 |
| | | | | 310/263 |
| 7,671,551 | B2* | 3/2010 | Bi | H02K 11/33 |
| | | | | 318/400.26 |
| 8,941,341 | B2 | 1/2015 | Rozman et al. | |
| 9,910,083 | B2 | 3/2018 | Viswanathan et al. | |
| 10,177,698 | B1 | 1/2019 | Gao et al. | |
| 2006/0284499 | A1* | 12/2006 | Rubbo | H02K 11/042 |
| | | | | 310/71 |
| 2008/0164852 | A1* | 7/2008 | Taniguchi | H02P 9/10 |
| | | | | 322/25 |
| 2016/0141988 | A1 | 5/2016 | Krolak et al. | |
| 2016/0365813 | A1* | 12/2016 | Graefling | H02P 9/48 |
| 2017/0070126 | A1* | 3/2017 | Sudan | H02P 9/10 |
| 2018/0038721 | A1* | 2/2018 | Shimura | G01F 25/10 |
| 2019/0245464 | A1* | 8/2019 | Wang | H02P 6/14 |
| 2019/0288632 | A1* | 9/2019 | Wang | H02M 7/5387 |

FOREIGN PATENT DOCUMENTS

| | | |
|---|---|---|
| CN | 109412480 A | 3/2019 |
| CN | 112350522 A | 2/2021 |

OTHER PUBLICATIONS

ETH Zurich:"Design of a Highly Efficient Brushless Current Excited Synchronous Motor for Automotive Purposes",(Jan. 1, 2014), total 211 pages.

Office Action dated Jun. 2, 2021, issued for Chinese Application No. 202011027321.2 (8 pages).

International Search Report dated Dec. 15, 2021, issued for International Application No. PCT/CN2021/119247 (11 pages).

Extended European Search Report dated Jan. 29, 2024, issued for European Application No. 21871438.4 (9 pages).

* cited by examiner

V(vgs)

V(vds)

PROTECTION APPARATUS AND BRUSHLESS MOTOR SYSTEM

CROSS-REFERENCE TO RELATED APPLICATIONS

This application is a continuation of International Application No. PCT/CN2021/119247, filed on Sep. 18, 2021, which claims priority to Chinese Patent Application No. 202011027321.2, filed on Sep. 25, 2020. The disclosures of the aforementioned applications are hereby incorporated by reference in their entireties.

TECHNICAL FIELD

This disclosure relates to the motor field, and in particular, to a protection apparatus and a brushless motor system.

BACKGROUND

Existing motors are mainly permanent-magnet synchronous motors. To improve efficiency of the motors in high-speed areas and reduce dependence on rare earth, a brushless synchronous motor becomes a feasible solution. The brushless synchronous motor mainly includes an armature winding, a rectifier circuit, an excitation winding, an excitation power supply circuit, a transformer, and a controller. The excitation power supply circuit receives a voltage output by a direct current power supply, converts the voltage into an alternating current voltage for power supply of the excitation winding, and then outputs the alternating current voltage to the rectifier circuit by using the transformer. The rectifier circuit converts the received alternating current voltage into a direct current voltage, and then directly outputs the direct current voltage to supply power to the excitation winding. The controller is configured to control power supply for the armature winding. During actual use, a protection circuit needs to be disposed near the excitation winding, to transfer or consume, when the motor is faulty or a load abruptly changes, energy of an electromotive force generated on the excitation winding. In addition, in the brushless synchronous motor, a primary side and a secondary side of the transformer are not directly connected. Therefore, when the excitation winding is abnormal, an alarm device needs to be disposed, when the motor is faulty, to send an alarm to the controller and disconnect the excitation power supply circuit from the excitation winding, so as to ensure operation safety of the motor.

Because the excitation winding rotates at a high speed, the protection circuit is disposed on the excitation winding, to ensure heat dissipation of the excitation winding. However, an alarm circuit cannot be disposed on the excitation winding. Currently, the alarm circuit of the motor is mainly disposed on the armature winding. The alarm circuit may be disposed on a special detection winding on the armature winding, to detect an electrical parameter of the armature winding, determine whether the motor is faulty, and when the brushless motor is faulty, generate the alarm to the controller and disconnect the excitation power supply circuit from the direct current power supply, so as to avoid damage to the excitation power supply circuit and the rectifier circuit.

However, when the alarm circuit is used to generate the alarm to the controller, the detection winding with high costs is added, and when the energy of the electromotive force is totally consumed, the direct current power supply and the excitation power supply circuit cannot be automatically reconnected. This affects operation of the motor.

Therefore, a fault protection mode of the existing motor needs to be studied.

SUMMARY

This disclosure provides a protection apparatus and a brushless motor system, to reduce costs of a brushless motor and ensure normal operation of the motor.

According to a first aspect, an embodiment of this disclosure provides a protection apparatus. The apparatus is used in a brushless motor system. The brushless motor system includes the protection apparatus, a controller, an armature winding, a rectifier circuit, an excitation winding connected to the rectifier circuit, an excitation power supply circuit, and a transformer connected between the rectifier circuit and the excitation power supply circuit.

Specifically, the protection apparatus may include a demagnetization apparatus and a control apparatus.

The demagnetization apparatus may be bridged between the rectifier circuit and the excitation winding, and is configured to consume, when the brushless circuit is faulty, excess electric energy generated on the excitation winding. The control apparatus is configured to separately connect to the controller and the excitation power supply circuit, and is configured to detect electrical parameters of an input terminal and an output terminal of the excitation power supply circuit, and when determining that the electrical parameters exceed a preset threshold range, generate an alarm to the controller and adjust the output electrical parameter of the excitation power supply circuit.

Further, a direction of a voltage output by the demagnetization apparatus is the same as a direction of a voltage output by the rectifier circuit. That the direction of the voltage output by the demagnetization apparatus is the same as the direction of the voltage output by the rectifier circuit may be specifically as follows: The demagnetization apparatus is connected in series to the rectifier circuit. In this case, one terminal that is of the rectifier circuit and that outputs a high potential is connected to one terminal that is of the demagnetization apparatus and that receives the high potential, and one terminal that is of the rectifier circuit and that outputs a low potential is connected to one terminal that is of the demagnetization apparatus and that receives the low potential.

In the foregoing apparatus structure, because the excitation power supply circuit is coupled to a path on which the excitation winding is located by using the transformer, when a motor is faulty and excess energy is generated on the excitation winding, the electrical parameter of the excitation power supply circuit also fluctuates, and the electrical parameter of the excitation power supply circuit can be detected, to determine whether the motor is faulty. Because a current of the excitation power supply circuit is small, a component with low costs can be used to implement a detection function, and the output electrical parameter of the excitation power supply circuit can be adjusted based on a fault of the brushless motor. This ensures normal operation of the motor while reducing protection costs.

In a possible implementation, the control apparatus may include a first sampling circuit, a second sampling circuit, and a control module.

The control module is separately connected to an output terminal of the first sampling circuit and an output terminal of the second sampling circuit.

A current input terminal of the first sampling circuit is configured to connect to the input terminal of the excitation power supply circuit and sample a current at the input terminal of the excitation power supply circuit. Two terminal points of a voltage input terminal of the first sampling circuit are configured to respectively connect to two terminal points of the input terminal of the excitation power supply circuit and sample a voltage between two terminals of the input terminal of the excitation power supply circuit. An input terminal of the second sampling circuit is configured to connect to the output terminal of the excitation power supply circuit and sample a current at the output terminal of the excitation power supply circuit. The control module is configured to separately connect to the controller and a control terminal of the excitation power supply circuit, and is configured to receive a current and a voltage that are output by the first sampling circuit and the second sampling circuit, and when determining that the received current and voltage exceed the preset threshold, generate the alarm to the controller and adjust the output electrical parameter of the excitation power supply circuit.

In the foregoing apparatus structure, a specific electrical parameter can be collected by using a sampling circuit to detect whether the brushless motor is faulty, and when the brushless motor is faulty, the output electrical parameter of the excitation power supply circuit can be reduced by using the control module, to avoid aggravating the fault of the brushless motor, and ensure that the motor can normally operate after the fault of the brushless motor is rectified.

In a possible implementation, the demagnetization apparatus may include an absorption circuit and a switch circuit.

The absorption circuit is configured to connect to the excitation winding, and is configured to consume, when the brushless motor system is faulty, excess electric energy generated on the excitation winding. The switch circuit is configured to separately connect to the rectifier circuit and the absorption circuit, and is configured to disconnect the rectifier circuit from the excitation winding when excess electric energy in a first direction is generated on the excitation winding, and reconnect the rectifier circuit to the excitation winding when the excess electric energy in the first direction is totally consumed.

In the foregoing apparatus structure, the absorption circuit can absorb the excess electric energy generated on the excitation winding, and when a direction of the electric energy generated on the excitation winding is the first direction, the rectifier circuit can be disconnected from the excitation circuit, to prevent the rectifier circuit from being damaged by energy of an electromotive force of the excitation winding, and ensure safety of components in the brushless motor.

In a possible implementation, the switch circuit includes a first switch, a first resistor, and a first capacitor.

A first terminal of the first resistor is configured to separately connect to a first output terminal of the rectifier circuit and a first terminal of the absorption circuit. A second terminal of the first resistor is separately connected to a first terminal of the first capacitor and a first terminal of the first switch. A second terminal of the first capacitor is configured to connect to a second output terminal of the rectifier circuit. A second terminal of the first switch is configured to connect to a second terminal of the absorption circuit. A control terminal of the first switch is connected to the second terminal of the first capacitor.

In the foregoing apparatus structure, a status of the first switch is changed based on a connection of the second terminal of the first capacitor and charging time of the second capacitor, to implement disconnection when the motor is faulty. This ensures that the excitation winding and a component connected to the excitation winding are not damaged due to an overvoltage.

In a possible implementation, the switch circuit further includes a voltage stabilizing diode.

A cathode of the voltage stabilizing diode is connected to the first terminal of the first capacitor. A second terminal of the voltage stabilizing diode is connected to the second terminal of the first capacitor.

In the foregoing apparatus structure, the voltage stabilizing diode can be used to limit a value of a startup voltage of the first switch, to avoid an energy waste caused by always charging the first capacitor.

In a possible implementation, the demagnetization circuit further includes a switch auxiliary circuit. The switch auxiliary circuit is connected to the switch circuit. The switch auxiliary circuit is configured to control a turn-on moment and a turn-off moment of the switch circuit.

In the foregoing apparatus structure, the turn-on moment and the turn-off moment of the switch circuit can be accurately controlled by using the switch auxiliary circuit.

In a possible implementation, the switch auxiliary circuit includes a second switch, a second resistor, a first diode, and a second capacitor.

A first terminal of the second switch is connected to the second terminal of the first resistor, and a second terminal of the second switch is connected to the second terminal of the first capacitor. An anode of the first diode is connected to the second terminal of the second switch, and a cathode of the first diode is separately connected to a first terminal of the second capacitor and a control terminal of the second switch. A second terminal of the second capacitor is connected to a first terminal of the second resistor. A second terminal of the second resistor is connected to the second terminal of the absorption circuit.

In the foregoing apparatus structure, a charging moment and a discharging moment of the first capacitor in the switch circuit are controlled by using the second switch, to accurately control the turn-on moment and the turn-off moment of the switch circuit.

In a possible implementation, the first sampling circuit includes a first current sensor and a first voltage sensor.

An input terminal of the first current sensor is configured to connect to the input terminal of the excitation power supply circuit, and an output terminal of the first current sensor is connected to the control module. Two terminal points of an input terminal of the first voltage sensor are configured to connect to the two terminals of the input terminal of the excitation power supply circuit, and an output terminal of the first voltage sensor is connected to the control module.

In the foregoing apparatus structure, the electrical parameter of the input terminal of the excitation power supply circuit can be sampled by using a voltage sensor and a current sensor.

In a possible implementation, the second sampling circuit includes a second current sensor.

An input terminal of the second current sensor is configured to connect to the output terminal of the excitation power supply circuit, and an output terminal of the second current sensor is connected to the control module.

In the foregoing apparatus structure, the electrical parameter of the output terminal of the excitation power supply circuit can be sampled by using the second current sensor.

In a possible implementation, when the rectifier circuit includes a rectifier bridge, the detection circuit further includes a second transient suppression diode.

A first terminal of the second transient suppression diode is configured to connect to a first output terminal of the rectifier circuit, and a second terminal of the second transient suppression diode is configured to connect to the second output terminal of the rectifier circuit.

In the foregoing apparatus structure, when the rectifier circuit includes only the rectifier bridge, to avoid fluctuation of an output voltage of the rectifier bridge, the second transient suppression diode can be disposed to clamp a voltage output by a rectifier.

In a possible implementation, the switch auxiliary circuit further includes a third transient suppression diode.

A first terminal of the third transient suppression diode is connected to the second terminal of the second resistor, and a second terminal of the third transient suppression diode is connected to the second terminal of the absorption circuit.

The foregoing apparatus structure is used to avoid a misoperation of the switch circuit caused by electric energy of an electromotive force.

According to a second aspect, an embodiment of this disclosure provides a brushless motor system. The brushless motor system may include an armature winding, a rectifier circuit, an excitation winding, an excitation power supply circuit, a transformer, a controller, and the protection apparatus provided in any one of the first aspect and the possible implementations in embodiments of this disclosure.

An input terminal of the excitation power supply circuit is configured to connect to a direct current power supply, and an output terminal of the excitation power supply circuit is connected to a primary side of the transformer. A secondary side of the transformer is connected to an input terminal of the rectifier circuit. The protection apparatus is separately connected to the rectifier circuit, the excitation winding, the excitation power supply circuit, and the controller. The armature winding is connected to the controller. The controller is connected to a power supply.

In the foregoing system structure, the protection apparatus provided in the first aspect can be used, to reduce fault detection costs of the brushless motor system and ensure normal operation of a brushless motor.

DESCRIPTION OF EMBODIMENTS

A brushless motor system provided in embodiments of this disclosure may be applied to technical application scenarios such as an electric vehicle, a numerical control machine tool, and a mobile robot. The brushless motor system may be a brushless motor system or a brushless generator system.

Figure 1:
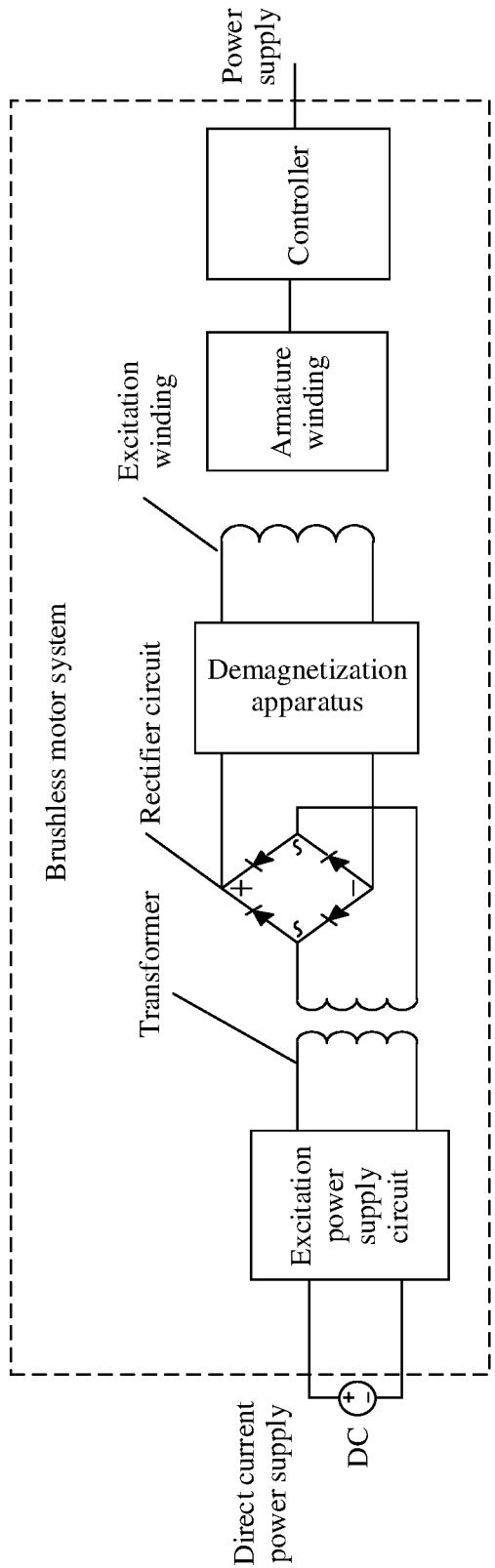
FIG. 1 is a schematic diagram of a structure of an application scenario.

Currently, FIG. 1 shows a structure of a brushless motor system. In FIG. 1, the brushless motor system includes an armature winding, a rectifier circuit, an excitation winding, an excitation power supply circuit, a transformer, and a controller. The excitation power supply circuit receives a voltage output by a direct current power supply, converts the voltage into an alternating current by using the excitation power supply circuit, and then outputs the alternating current to the rectifier circuit by using the transformer. The rectifier circuit converts the received alternating current voltage into a direct current voltage, and then directly outputs the direct current voltage to supply power to the excitation winding. The controller is configured to control power supply for the armature winding. The armature winding generates a rotating magnetic field to drive the excitation winding to rotate, so that the brushless motor system can operate.

Figure 2:
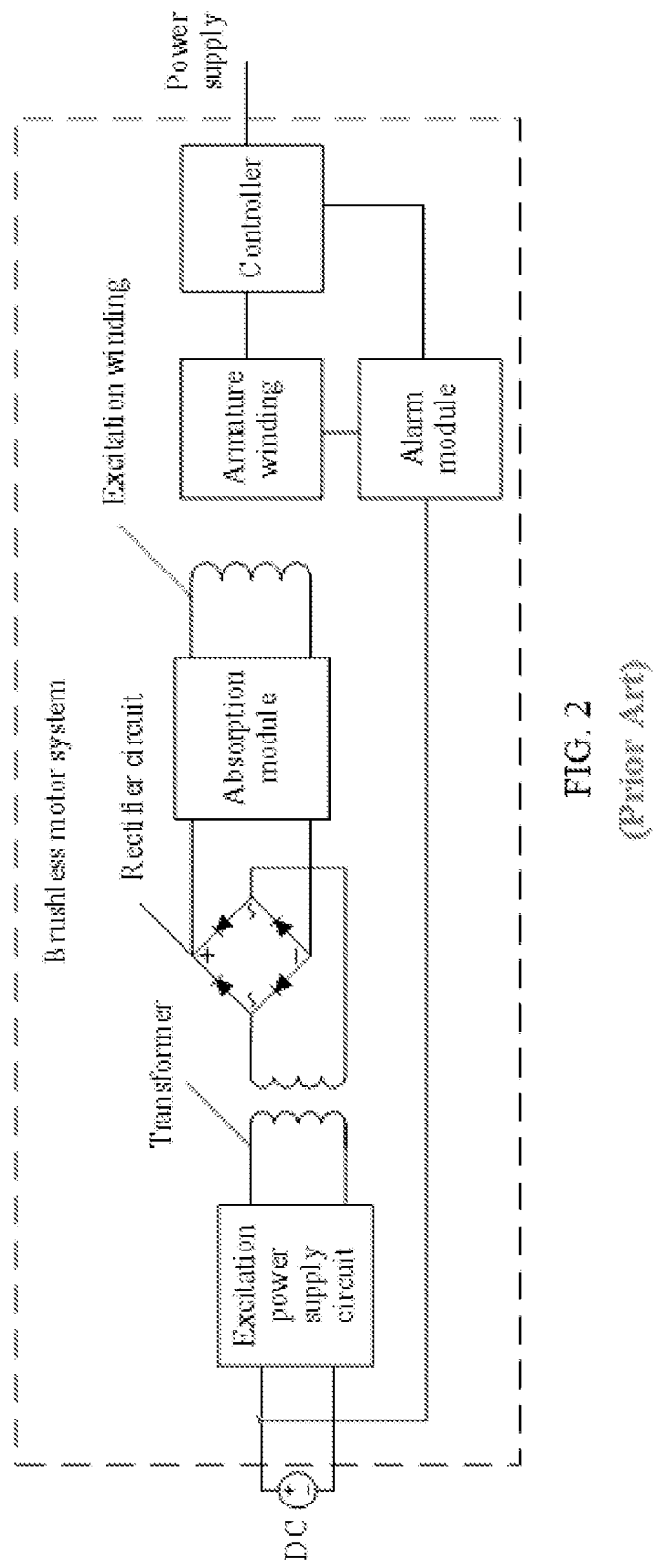
FIG. 2 is a schematic diagram of a structure of a protection apparatus in the conventional technology.

During actual application, a protection apparatus needs to be disposed in the brushless motor system, to protect the brushless motor system during operation. Specifically, FIG. 2 shows a possible structure of the protection apparatus. The protection apparatus includes an absorption module and an alarm module. The absorption module is connected between the excitation winding and the rectifier circuit. The alarm module is separately connected to the armature winding, the controller, and the excitation power supply circuit. The absorption module may consume an electromotive force when the excitation winding generates the electromotive force due to a fault of a brushless motor. The alarm module may detect an electrical parameter of the armature winding by using a detection winding disposed on the armature winding, determine, based on the detected electrical parameter, whether the brushless motor system is faulty, and generate an alarm to the controller when determining that the brushless motor system is faulty. In addition, to prevent electric energy output by the direct current power supply from aggravating a fault of the system, the excitation power supply circuit is disconnected from the direct current power supply.

However, when the protection apparatus is used to protect the brushless motor system, because a value of a current flowing through the armature winding is large, a dedicated detection winding needs to be installed on the armature winding for detection. This increases costs of the brushless motor system, and a time for reconnecting the excitation power supply circuit to the direct current power supply cannot be controlled after the excitation power supply circuit is disconnected from the direct current power supply. As a result, normal operation of the brushless motor system is affected in severe cases.

Therefore, the protection apparatus of the brushless motor system in the conventional technology increases costs of the brushless motor system and cannot ensure normal operation of the motor. Therefore, embodiments of this disclosure provide a protection apparatus and a brushless motor system, to reduce costs of the brushless motor system and ensure normal operation of the brushless motor system.

In embodiments of this disclosure, the term "or" describes an association relationship between associated objects and may represent two relationships. For example, A or B may represent the following cases: Only A exists and only B exists, where A and B may be singular or plural.

The term "connection" used in this disclosure describes a connection relationship between two objects, and may represent two types of connection relationships. For example, A and B are connected, which may represent two cases: A and B are directly connected, and A is connected to B by using C.

In embodiments of this disclosure, "example", "in some embodiments", "in another embodiment", and the like are used to represent an example, an illustration, or a description. Any embodiment or design scheme described as an "example" in this disclosure should not be explained as being more preferred or having more advantages than another embodiment or design scheme. Exactly, the term "example" is used to present a concept in a specific manner.

It should be noted that, in embodiments of this disclosure, terms such as "first" and "second" are only used for a purpose of distinction in description, and should not be understood as an indication or implication of relative importance or an indication or implication of a sequence. In embodiments of this disclosure, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than".

Embodiments of this disclosure provide a protection apparatus and a brushless motor system, to reduce costs of a brushless motor and ensure normal operation of the brushless motor system.

Figure 3:
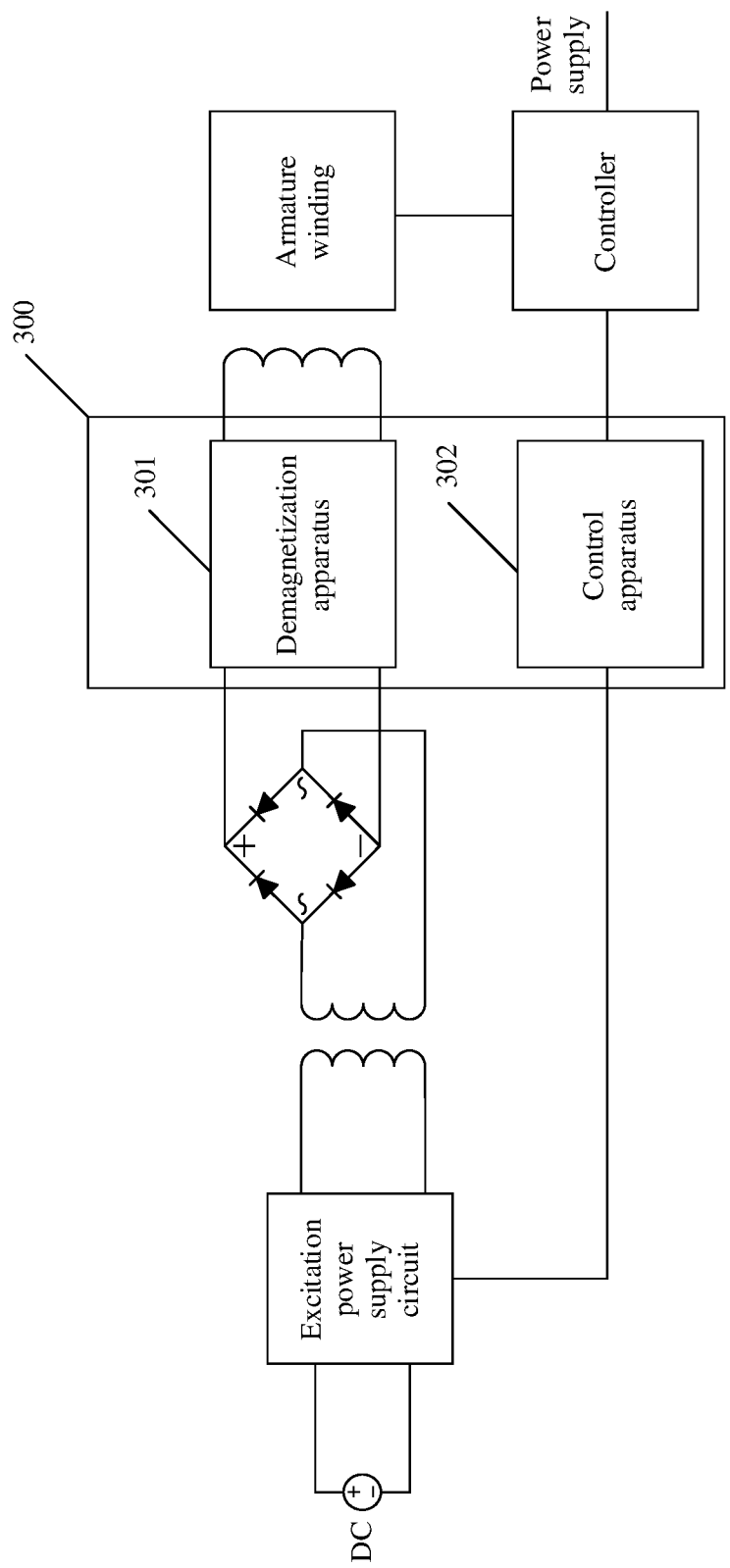
FIG. 3 is a schematic diagram of a structure of a protection apparatus according to an embodiment of this disclosure.

FIG. 3 is a schematic diagram of a structure of a protection apparatus according to an embodiment of this disclosure. The protection apparatus 300 is used in a brushless motor system. The protection apparatus may include a demagnetization apparatus 301 and a control apparatus 302.

The demagnetization apparatus 301 is configured to be bridged between a rectifier circuit and an excitation winding, and is configured to consume, when the brushless motor system is faulty, excess electric energy generated on the excitation winding. The control apparatus 302 is configured to separately connect to an excitation power supply circuit and a controller, and is configured to detect electrical parameters of an input terminal and an output terminal of the excitation power supply circuit, and when determining that the electrical parameters exceed a preset threshold range, generate an alarm to the controller and adjust the output electrical parameter of the excitation power supply circuit. The preset threshold may be determined based on a type of a direct current power supply connected to the excitation power supply circuit and a load connected to a brushless motor. Details are not described in this embodiment of this disclosure.

Further, a direction of a voltage output by the demagnetization apparatus 301 is the same as a direction of a voltage output by the rectifier circuit. That the direction of the voltage output by the demagnetization apparatus 301 is the same as the direction of the voltage output by the rectifier circuit may be specifically as follows: The demagnetization apparatus 301 is connected in series to the rectifier circuit. In this case, one terminal that is of the rectifier circuit and that outputs a high potential is connected to one terminal that is of the demagnetization apparatus 301 and that receives the high potential, and one terminal that is of the rectifier circuit and that outputs a low potential is connected to one terminal that is of the demagnetization apparatus 301 and that receives the low potential. An output voltage of the rectifier circuit is equal to a potential difference between the terminal that is of the demagnetization apparatus 301 and that receives the high potential and the terminal that is of the demagnetization apparatus 301 and that receives the low potential.

When the protection apparatus 300 is configured to protect the brushless motor system in operation, an electromotive force is generated at two terminals of the excitation winding when the brushless motor system is faulty. A magnetic field generated by the electromotive force may cause changes of electrical parameter values of the excitation winding and the excitation power supply circuit connected to the excitation winding by using the transformer. The demagnetization apparatus 301 absorbs the electromotive force generated at the two terminals of the excitation winding. The control apparatus 302 detects the electrical parameter of the excitation power supply circuit, and when determining, based on the received electrical parameter, that the brushless motor system is faulty, generates the alarm to the controller and adjusts the output parameter of the excitation power supply circuit.

It should be understood that, to prevent electric energy output by the direct current power supply from aggravating a fault of the brushless motor system, electric energy output by the excitation power supply circuit to the excitation winding is reduced when it is determined, based on the detected electrical parameter value, that the brushless motor system is faulty. In addition, after the fault of the brushless motor system is eliminated, that is, after the electromotive force generated on the excitation winding is totally consumed and the electrical parameter of the excitation power supply circuit is restored to normal, the electric energy supplied by the excitation power supply circuit to the excitation winding is increased, to ensure normal operation of the brushless motor system.

During specific implementation, the excitation power supply circuit may be an H-bridge rectifier circuit including components such as a plurality of switching transistors and an inductor. An operating status of the excitation power supply circuit may be implemented by adjusting drive signals of these switching transistors. When the drive signal of the switching transistor changes, the operating status of the excitation power supply circuit changes, and the output electrical parameter value of the excitation power supply circuit also changes. Therefore, the electrical parameter of the excitation power supply circuit changes.

The following describes specific structures of the demagnetization apparatus 301 and the control apparatus 302 in the protection apparatus 300.

1. Demagnetization Apparatus 301

The demagnetization apparatus 301 is connected between the rectifier circuit and the excitation winding, and when the brushless motor system is faulty, consumes the excess electric energy generated on the excitation winding.

Specifically, based on a structure of the rectifier circuit connected to the demagnetization apparatus 301, the demagnetization apparatus 301 provided in this embodiment of this disclosure may be divided into two specific circuit structures. The following describes a circuit structure of the demagnetization apparatus 301 provided in this embodiment of this disclosure with reference to an embodiment. Specifically, the following two solutions may be included:

Solution 1: The rectifier circuit includes an H-bridge rectifier circuit and a filter capacitor connected to the H-bridge rectifier circuit.

The demagnetization apparatus 301 may include an absorption circuit and a switch circuit.

The absorption circuit may be configured to connect to the excitation winding. The switch circuit may be configured to separately connect to the rectifier circuit and the absorption circuit.

Specifically, the absorption circuit is disposed to: when the brushless motor system is faulty, consume the excess electric energy generated on the excitation winding, to avoid damage to a component connected to the excitation winding caused by the excess electric energy generated on the excitation winding. The switch circuit is disposed to: when excess electric energy in a first direction is generated on the excitation winding, disconnect the rectifier circuit from the excitation winding, so that the excess electric energy generated on the excitation winding can be consumed only by using the absorption circuit, and when the excess electric energy in the first direction is totally consumed, the rectifier circuit and the excitation winding are reconnected. If a direction of a current output by the electromotive force generated on the excitation winding is opposite to a direction of an original current of the excitation winding, it is determined that the excess electric energy in the first direction is generated on the excitation winding. The original current of the excitation winding is a current of the excitation winding when the brushless motor system is not faulty.

Specifically, the absorption circuit may be a first transient suppression diode.

When the absorption circuit is used to absorb the excess electric energy generated on the excitation winding, the electromotive force generated on the excitation winding when a brushless motor is faulty may cause a change of a voltage between two terminals of the excitation winding. When a value of the voltage between the two terminals of the excitation winding exceeds a startup voltage of the first transient suppression diode, the first transient suppression diode consumes the voltage of the excitation winding and clamps the voltage between the two terminals of the excitation winding. Therefore, the component connected to the excitation winding is not damaged due to an overvoltage. The startup voltage of the first transient suppression diode may be a peak voltage of the excitation winding in an operation process of the brushless motor system.

In actual application, the absorption circuit may also use another structure. For example, the absorption circuit may use a varistor, and clamp and absorb electric energy of the electromotive force by using the varistor. Details are not described herein in this disclosure.

The switch circuit may include a first switch, a first resistor, and a first capacitor.

Specifically, a first terminal of the first resistor is configured to separately connect to a first output terminal of the rectifier circuit and a first terminal of the absorption circuit. A second terminal of the first resistor is separately connected to a first terminal of the first capacitor and a first terminal of the first switch. A second terminal of the first capacitor is configured to connect to a second output terminal of the rectifier circuit. A second terminal of the first switch is configured to connect to a second terminal of the absorption circuit. A control terminal of the first switch is connected to the second terminal of the first capacitor.

Optionally, the switch circuit provided in this embodiment of this disclosure may further include a switch auxiliary circuit.

It should be understood that, when the excess electric energy in the first direction is generated on the excitation winding, to avoid a loss of a component, the switch circuit needs to be controlled to disconnect the rectifier circuit from the excitation power supply circuit, and the switch auxiliary circuit may be connected to the switch circuit, to accurately control a turn-off moment and a turn-on moment of the switch circuit.

The switch auxiliary circuit may include a second switch, a second resistor, a first diode, and a second capacitor.

Specifically, a first terminal of the second switch is connected to the second terminal of the first resistor, and a second terminal of the second switch is connected to the second terminal of the first capacitor. An anode of the first diode is connected to the second terminal of the second switch, and a cathode of the first diode is separately connected to a first terminal of the second capacitor and a control terminal of the second switch. A second terminal of the second capacitor is connected to a first terminal of the second resistor. A second terminal of the second resistor is connected to the second terminal of the absorption circuit.

For ease of understanding, the following provides a specific example of the demagnetization apparatus 301.

Figure 4:
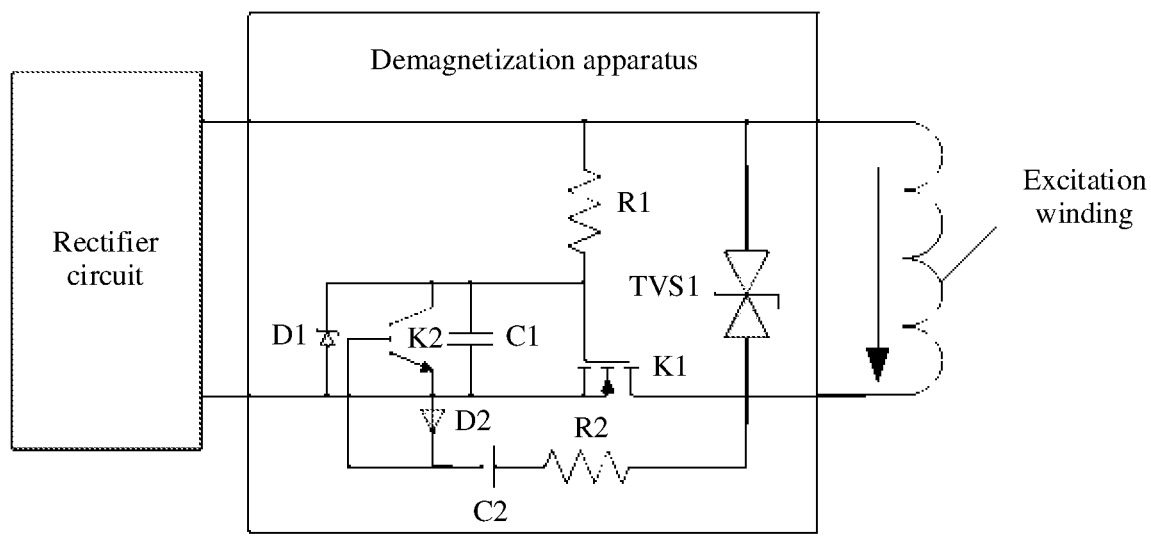
FIG. 4 is a schematic diagram 1 of a structure of a demagnetization apparatus according to an embodiment of this disclosure.

FIG. 4 is a schematic diagram of a structure of the demagnetization apparatus 301 according to an embodiment of this disclosure. In FIG. 4, TVS1 forms the absorption circuit, R1 is the first resistor, D1 is the first diode, K1 is the first switch, C1 is the first capacitor, and R1, D1, K1, and C1 form the switch circuit, K2 is the second switch, D2 is the second diode, C2 is the second capacitor, R2 is the second resistor, and K2, D2, C2, and R2 form the switch auxiliary circuit.

When the excess electric energy generated on the excitation winding is absorbed by using the demagnetization apparatus shown in FIG. 4, TVS1 receives the excess electric energy generated on the excitation winding, the energy is from right to left, and the right excess electric energy generated on the excitation winding is consumed.

Specifically, TVS1 is directly connected to the two terminals of the excitation winding. When the electromotive force is generated on the excitation winding due to the fault of the brushless motor, the electromotive force may cause changes of a voltage between two terminals of TVS1 and the voltage between the two terminals of the excitation winding.

Figure 5:
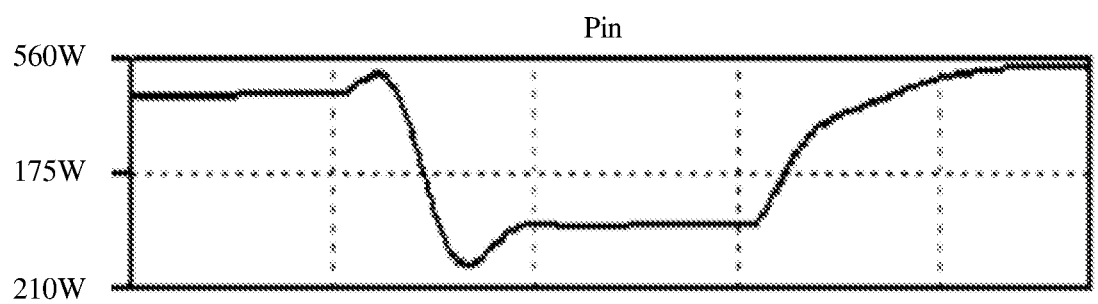
FIG. 5 is a diagram of an output power curve of an excitation power supply circuit according to an embodiment of this disclosure.

A direction of the current of the excitation winding is from top to bottom. For details, refer to a direction of an arrow in FIG. 4. To be specific, a direction of a potential at two terminals of the excitation winding is positive at the upper terminal and negative at the lower terminal. When an electromotive force that is positive at the upper terminal and is negative at the lower terminal is generated on the excitation winding due to the fault of the brushless motor, a direction of the electromotive force is the same as a direction of an original potential of the excitation winding, the voltage between the two terminals of the excitation winding increases, and the current flowing through the excitation winding decreases, which is equivalent to increasing an output impedance load of the brushless motor system. In this case, an output power of the excitation power supply circuit decreases. FIG. 5 shows a power change curve when the excitation winding is faulty. Because the voltage between the two terminals of the excitation winding is always in a high-voltage state, when the voltage value increases to the startup voltage of TVS1, TVS1 absorbs the electric energy of the electromotive force and clamps the voltage between the two terminals of the excitation winding, to ensure that the rectifier circuit and the excitation power supply circuit are not damaged due to an overvoltage. In addition, before TVS1 totally consumes the electromotive force, C1 is always in a charging state, and K1 receives a drive voltage that meets a condition. Therefore, K1 is always in a turn-on state. In this case, a branch in which R2 and C2 are located is short-circuited by K1, and K2 does not operate. A value of a clamp voltage may be determined based on a model of the brushless motor and a load connected to the brushless motor system. Details are not described herein in this embodiment of this disclosure.

Figure 6:
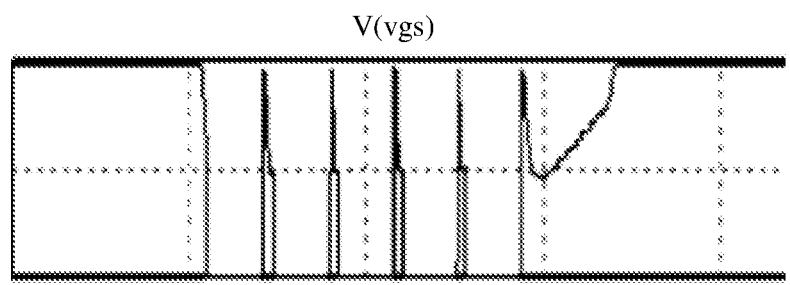
FIG. 6 is a diagram of a voltage curve of a drive signal of a first switch according to an embodiment of this disclosure.
Figure 7:
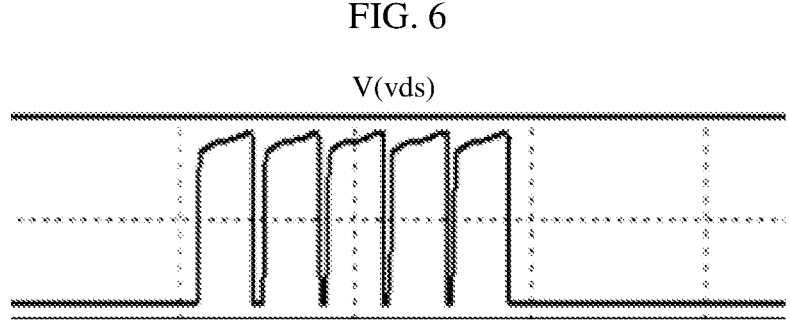
FIG. 7 is a diagram of a voltage curve of a first switch according to an embodiment of this disclosure.

When the electromotive force that is negative at the upper terminal and is positive at the lower terminal is generated on the excitation winding due to the fault of the brushless motor system, a direction of the electromotive force is opposite to a direction of an original potential of the excitation winding, the current flowing through the excitation winding increases, the voltage between the two terminals of the excitation winding decreases to zero, or even the direction of the original potential of the excitation winding changes, and two diodes connected in series on the rectifier circuit may be turned on through decrease of the voltage between the two terminals of the excitation winding, to short-circuit the excitation winding. Therefore, a drive voltage of K1 is zero and less than the startup voltage, and K1 disconnects the rectifier circuit from the excitation winding, and absorbs, by using TVS1, the electromotive force generated on the excitation winding. Because the rectifier circuit is disconnected from the excitation winding at this time, the rectifier circuit is in a short-circuit state, and C1 is discharged by using R1. When K1 is not totally turned off due to a voltage between two terminals of C1, a resistance at two terminals of K1 increases, and a branch in which C2 and R2 are located is connected. When the current flowing through a base of K2 is greater than a startup current of K2, K2 is turned on and electric energy stored in C1 is quickly released. This accelerates turn-off of K1 and avoids a great loss or even damage caused by K1 staying in a linear resistance state for a long period of time. K1 cannot receive the drive voltage and disconnects the rectifier circuit from the excitation winding again. If the electromotive force of the excitation winding is not totally consumed at this time, the foregoing process is repeated, voltage change curves of the drive signal Vgs of K1 and the voltage Vds between the two terminals of K1 are respectively shown in FIG. 6 and FIG. 7 until the energy of the electromotive force generated on the excitation winding is totally consumed.

It should be understood that a turn-off moment of K1 is related to a power-on moment of a branch in which C1 and R1 are located in the switch auxiliary circuit. To accurately control the turn-off moment of K1, this embodiment of this disclosure may include a third transient suppression diode. A value of a startup voltage of the third transient suppression diode may be set to accurately control the turn-off moment of K1.

Solution 2: The rectifier circuit includes only an H-bridge rectifier circuit including switching transistors.

The demagnetization apparatus 301 may include an absorption circuit, a switch circuit, and a switch auxiliary circuit, and may further include a second transient suppression diode and a third transient suppression diode. Structures of the absorption circuit, the switch circuit, and the switch auxiliary circuit are the same as circuit structures of the absorption circuit, the switch circuit, and the switch auxiliary circuit provided in Solution 1 of this disclosure. Details are not described herein again in this disclosure.

It should be understood that, when the rectifier circuit includes only the H-bridge rectifier circuit, an output voltage value of the rectifier circuit fluctuates with an input voltage of the rectifier circuit, and is extremely susceptible to interference. To ensure operation stability of the brushless motor system, the second transient diode may be connected to the rectifier circuit, to stabilize stability of the output voltage of the rectifier circuit and avoid damage to a component connected to the rectifier circuit due to an overvoltage.

Specifically, a first terminal of the second transient suppression diode is configured to connect to a first output terminal of the rectifier circuit, and a second terminal of the second transient suppression diode is configured to connect to a second output terminal of the rectifier circuit. A first terminal of the third transient suppression diode is connected to a second terminal of the second resistor, and a second terminal of the second transient suppression diode is connected to a second terminal of the absorption circuit.

It should be understood that the second transient suppression diode can clamp the voltage output by the rectifier circuit only when the voltage output by the rectifier circuit is greater than a startup voltage of the second transient suppression diode, to stabilize the voltage output by the rectifier circuit. When the voltage output by the rectifier circuit is less than the startup voltage of the second transient suppression diode, a startup voltage of the third transient suppression diode may be set, to avoid that K1 is turned off by mistake because the output voltage of the rectifier circuit is extremely low, and improve operation reliability of the demagnetization apparatus.

Figure 8:
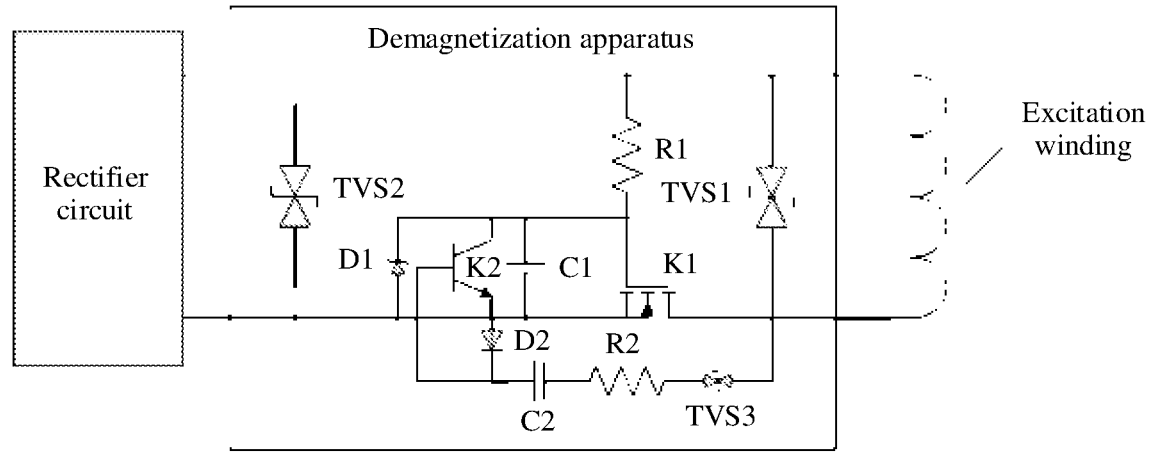
FIG. 8 is a schematic diagram 2 of a structure of a demagnetization apparatus according to an embodiment of this disclosure.

For a circuit structure of the demagnetization apparatus, refer to FIG. 8. The second transient suppression diode is TVS2, and the third transient suppression diode is TVS3. Because a working principle in which the demagnetization apparatus 301 consumes the electromotive force generated on the excitation winding is the same as the working principle in Solution 1, details are not described herein in this embodiment of this disclosure.

2. Control Apparatus 302

The control apparatus 302 is configured to separately connect to the excitation power supply circuit and the controller, and is configured to detect the electrical parameters of the input terminal and the output terminal of the excitation power supply circuit, and when determining that the electrical parameters exceed the preset threshold range, generate the alarm to the controller and adjust the output electrical parameter of the excitation power supply circuit.

When the control apparatus is used to detect the electrical parameter of the excitation power supply circuit, when the electromotive force is generated on the excitation winding due to the fault of the brushless motor, the electromotive force may cause electrical parameter values of the excitation winding, the rectifier circuit, and the excitation power supply circuit. In addition, because the electric energy at the two terminals of the excitation winding increases, if the excitation power supply circuit still outputs a high power to the excitation winding, the excitation winding and the rectifier circuit connected to the excitation winding may be damaged. Therefore, when it is determined, based on an electrical parameter value of the excitation winding, that the brushless motor system is faulty, a current and a voltage output to the excitation power supply circuit may be reduced, to avoid damage to the rectifier circuit and the excitation winding.

The control apparatus 302 may include a first sampling circuit, a second sampling circuit, and a control module.

Specifically, a current input terminal of the first sampling circuit is configured to connect to an input terminal of the excitation power supply circuit and sample a current at the input terminal of the excitation power supply circuit. Two terminal points of a voltage input terminal of the first sampling circuit are configured to respectively connect to two terminal points of the input terminal of the excitation power supply circuit and sample a voltage between two terminals of the input terminal of the excitation power supply circuit. An input terminal of the second sampling circuit is configured to connect to an output terminal of the excitation power supply circuit and sample a current at the output terminal of the excitation power supply circuit. The control module is separately connected to an output terminal of the first sampling circuit and an output terminal of the second sampling circuit. The control module is configured to separately connect to the controller and a control terminal of the excitation power supply circuit, and is configured to receive a current and a voltage that are output by the first sampling circuit and the second sampling circuit, and when determining that the received current and voltage exceed the preset threshold range, generate an alarm to the controller and adjust the output electrical parameter of the excitation power supply circuit.

The first sampling circuit may include a first current sensor and a first voltage sensor. The second sampling circuit may include a second current sensor.

Specifically, an input terminal of the first current sensor is configured to connect to the input terminal of the excitation power supply circuit, and an output terminal of the first current sensor is connected to the control module. Two terminal points of an input terminal of the first voltage sensor are configured to connect to two terminals of the input terminal of the excitation power supply circuit, and an output terminal of the first voltage sensor is connected to the control module. An input terminal of the second current sensor is configured to connect to the output terminal of the excitation power supply circuit, and an output terminal of the second current sensor is connected to the control module.

The first current sensor and the second current sensor may be but are not limited to a current sampling resistor, a current divider, a current transformer, or a Hall effect sensor. The first voltage sensor may be but is not limited to a voltage transformer or a Hall effect sensor.

The preset threshold range includes a preset current threshold range. Specifically, an output current of the excitation power supply circuit is detected, and the detected output current is compared with the preset current threshold range. When it is determined that the output current is less than a smallest value within the preset current threshold range and a power calculated based on an input current and an output voltage of the excitation power supply circuit changes, it is determined that an electromotive force in a first direction is generated on the excitation winding. In this case, the output electrical parameter of the excitation power supply circuit is reduced. In addition, the output current of the excitation power supply circuit is detected, and the detected output current is compared with the preset current threshold range. When it is determined that the output current is greater than a largest value within the preset current threshold range and the power calculated based on the input current and the output voltage of the excitation power supply circuit changes, it is determined that an electromotive force in a second direction is generated on the excitation winding. In this case, the output electrical parameter of the excitation power supply circuit is reduced.

It should be understood that, to quickly protect the excitation winding, in this embodiment of this disclosure, the output current of the excitation power supply circuit is detected and the detected output current is compared with the preset current threshold range. When it is determined that the output current is less than the smallest value within the preset current threshold range, it is directly determined that the electromotive force in the first direction is generated on the excitation winding. In this case, the output electrical parameter of the excitation power supply circuit is reduced.

During specific implementation, the control module may be connected to a control terminal of the switching transistor that is in the excitation power supply circuit and that forms the H-bridge rectifier circuit. The control module controls a sending moment and duration of the drive signal of the switching transistor, to control the output electrical parameter value of the excitation power supply circuit.

Specifically, in the brushless motor system, the controller or an excitation power supply circuit controller is mostly used to control the drive signal of the excitation power supply circuit, to adjust the operating status of the excitation power supply circuit. During actual application, the control apparatus 302 may be fixed in the excitation power supply circuit controller or the controller. In another implementation, a fixed interface is disposed on the controller, and the control apparatus is connected to the controller through the fixed interface disposed on the controller, to send an alarm to the controller.

Figure 9:
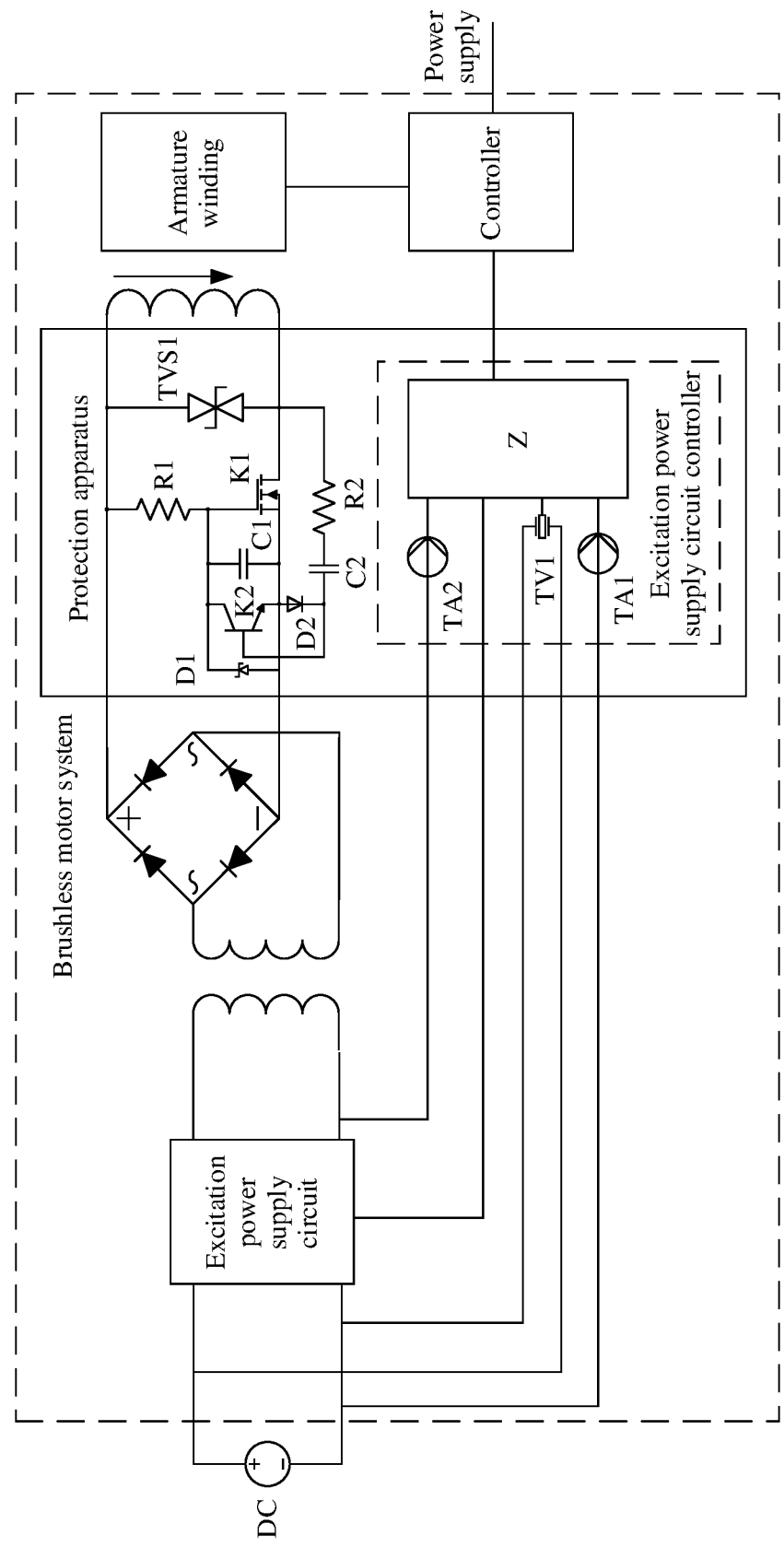
FIG. 9 is a schematic diagram 1 of a circuit structure of a protection apparatus according to an embodiment of this disclosure.

With reference to the foregoing descriptions, for example, a protection apparatus provided in this embodiment of this disclosure may be shown in FIG. 9.

A demagnetization apparatus includes: TVS1, R1, D1, K1, C1, K2, D2, C2, and R2. TVS1 is connected in parallel to an excitation winding. One terminal of R1 is separately connected to a first terminal of TVS1 and a first terminal of a rectifier circuit. One terminal of R1 is separately connected to a first terminal of K1, a first terminal of C1, a first terminal of K2, and a cathode of D1. A second terminal of C1 is separately connected to an anode of D1, a control terminal of K1, a control terminal of K2, and a second terminal of the rectifier circuit. A second terminal of K1 is connected to a second terminal of TVS1. A second terminal of K2 is connected to an anode of D2. A cathode of D2 is connected to a first terminal of C2. A first terminal of R2 is connected to a second terminal of C2, and a second terminal of R2 is connected to the second terminal of TVS1.

A control apparatus includes TV1, TA1, TA2, and a controller Z. A first terminal of TV1 is connected to two terminal points of an input terminal of an excitation power supply circuit, and the other terminal of TV1 is connected to Z. An input terminal of TA1 is connected to the input terminal of the excitation power supply circuit, and an output terminal of TA1 is connected to Z. An input terminal of TA2 is connected to an output terminal of the excitation power supply circuit, and an output terminal of TA2 is connected to Z. The control apparatus is disposed in an excitation power supply circuit controller.

Specifically, when a brushless motor system normally operates, a direction of a current of the excitation winding is indicated by an arrow direction in the figure. A direction of an original potential of the excitation winding is positive at the upper terminal and negative at the lower terminal. TV1, TA1, and TA2 detect electrical parameters of the excitation power supply circuit, and send the electrical parameters to Z.

When the brushless motor system is faulty, a load connected to a brushless motor changes. To avoid sudden changes of the electrical parameters, the excitation winding generates an electromotive force at two terminals of the excitation winding, the electromotive force causes changes of electrical parameter values of the excitation winding and the excitation power supply circuit. When a direction of the electromotive force generated on the excitation winding is positive at the upper terminal and negative at the lower terminal, the direction of the electromotive force is the same as a direction of an original potential of the excitation winding, and a voltage between two terminals of the excitation winding increases. Because the electromotive force is equivalent to a current output by a power supply on the excitation winding, and the direction of the current output by the electromotive force is opposite to a direction of an original current of the excitation winding, a current flowing through the excitation winding decreases, which is equivalent to increasing an output impedance of the brushless motor system. In this case, an output power of the excitation power supply circuit decreases. Because the voltage between the two terminals of the excitation winding is always in a high-voltage state, when the voltage value increases to a startup voltage of TVS1, TVS1 absorbs electric energy of the electromotive force and clamps the voltage between two terminals of the excitation winding, to ensure that the rectifier circuit and the excitation power supply circuit are not damaged due to an overvoltage. In addition, before TVS1 totally consumes the electromotive force, C1 is always in a charging state, and K1 receives a drive voltage that meets a condition. Therefore, K1 is always in a turn-on state. In addition, because a value of the power output by the excitation power supply circuit is fixed, when the electromotive force generated by the excitation winding decreases the current of the excitation winding and the voltage increases, the output voltage of the excitation power supply circuit increases and the output current decreases. When detecting that a value of a current output by a power supply decreases and exceeds a preset threshold range, TA2 determines that the brushless motor system is faulty, and the circuit is controlled to decrease an output voltage value and a current value of the excitation power supply circuit.

A value of a clamp voltage may be determined based on a model of the brushless motor and a load connected to the brushless motor system. Details are not described herein in this embodiment of this disclosure.

If the direction of the generated electromotive force is opposite to the direction of the original potential of the excitation winding, the current flowing through the excitation winding increases, the voltage between the two terminals of the excitation winding decreases to zero or even the direction of the original potential of the excitation winding changes. Two diodes connected in series on the rectifier circuit are turned on through decrease of the voltage between the two terminals of the excitation winding, to short-circuit the rectifier circuit. C1 is discharged by using R1. When K1 is not totally turned off due to a voltage between two terminals of C1, a resistance at two terminals of K1 increases, and a branch in which C2 and R2 are located is connected. When a current flowing through C2 is greater than a startup current of K2, K2 is turned on to quickly release electric energy stored in C1. This accelerates turn-off of K1, and avoids a great loss or even damage caused by K1 staying in a linear resistance area for a long period of time. If the electromotive force of the excitation winding is not totally consumed at this time, the foregoing process is repeated until the energy of the electromotive force generated on the excitation winding is totally consumed. Similarly, when detecting that the value of the current output by the excitation power supply circuit increases and exceeds the preset threshold range, TA2 determines that the brushless motor system is faulty, and the circuit is controlled to decrease the output voltage value and the output current value of the excitation power supply circuit.

Figure 10:
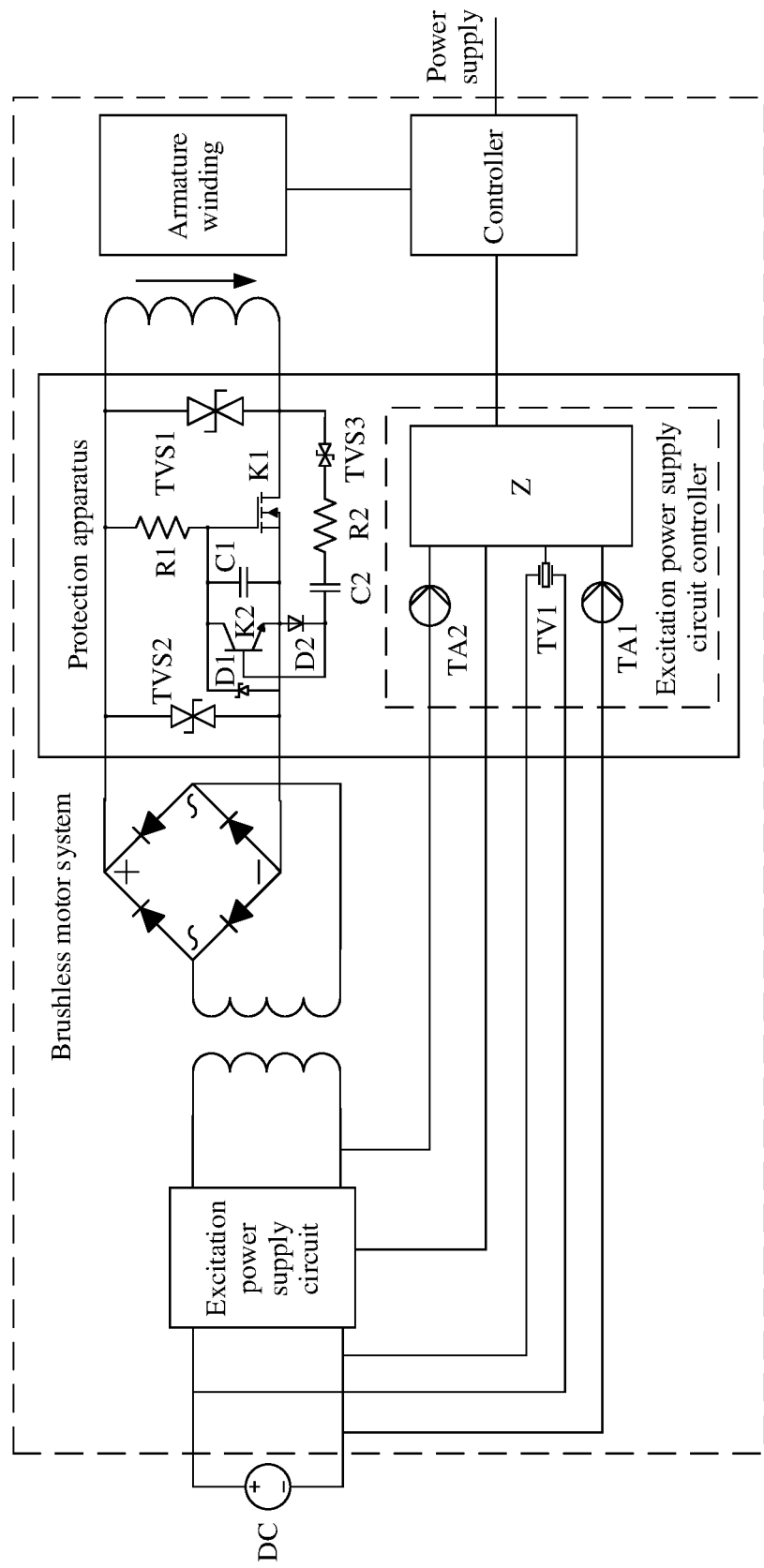
FIG. 10 is a schematic diagram 2 of a circuit structure of a protection apparatus according to an embodiment of this disclosure.

With reference to the foregoing descriptions, for example, another protection apparatus provided in this embodiment of this disclosure may be shown in FIG. 10.

A demagnetization apparatus includes: TVS1, R1, D1, K1, C1, K2, D2, C2, and R2. TVS1 is connected in parallel to an excitation winding. One terminal of R1 is separately connected to a first terminal of TVS1 and a first terminal of a rectifier circuit. One terminal of R1 is separately connected to a first terminal of K1, a first terminal of C1, a first terminal of K2, and a cathode of D1. A second terminal of C1 is separately connected to an anode of D1, a control terminal of K1, a control terminal of K2, and a second terminal of the rectifier circuit. A second terminal of K1 is connected to a second terminal of TVS1. A second terminal of K2 is connected to an anode of D2. A cathode of D2 is connected to a first terminal of C2. A first terminal of R2 is connected to a second terminal of C2, and a second terminal of R2 is connected to a first terminal of TVS3.

A second terminal of TVS3 is connected to the second terminal of TVS1.

Two terminals of TVS2 are respectively connected to two output terminals of the rectifier circuit.

A control apparatus includes TV1, TA1, TA2, and a controller Z. A first terminal of TV1 is connected to two terminal points of an input terminal of an excitation power supply circuit, and the other terminal of TV1 is connected to Z. An input terminal of TA1 is connected to the input terminal of the excitation power supply circuit, and an output terminal of TA1 is connected to Z. An input terminal of TA2 is connected to an output terminal of the excitation power supply circuit, and an output terminal of TA2 is connected to Z. The control apparatus is disposed in an excitation power supply circuit controller.

During specific implementation, two terminals of TVS2 are connected to two terminals of an output terminal of the rectifier circuit, and are configured to absorb a high-voltage signal output by the rectifier circuit, and clamp a voltage output by the rectifier circuit. TVS3 is configured to control a turn-off moment of K1 and prevent K1 from being turned off by mistake when the rectifier circuit outputs a low voltage.

Operating processes of the demagnetization apparatus and the control apparatus are the same as operating processes of the demagnetization apparatus and the control apparatus in the foregoing apparatus in this disclosure. Details are not described herein again in this disclosure.

Figure 11:
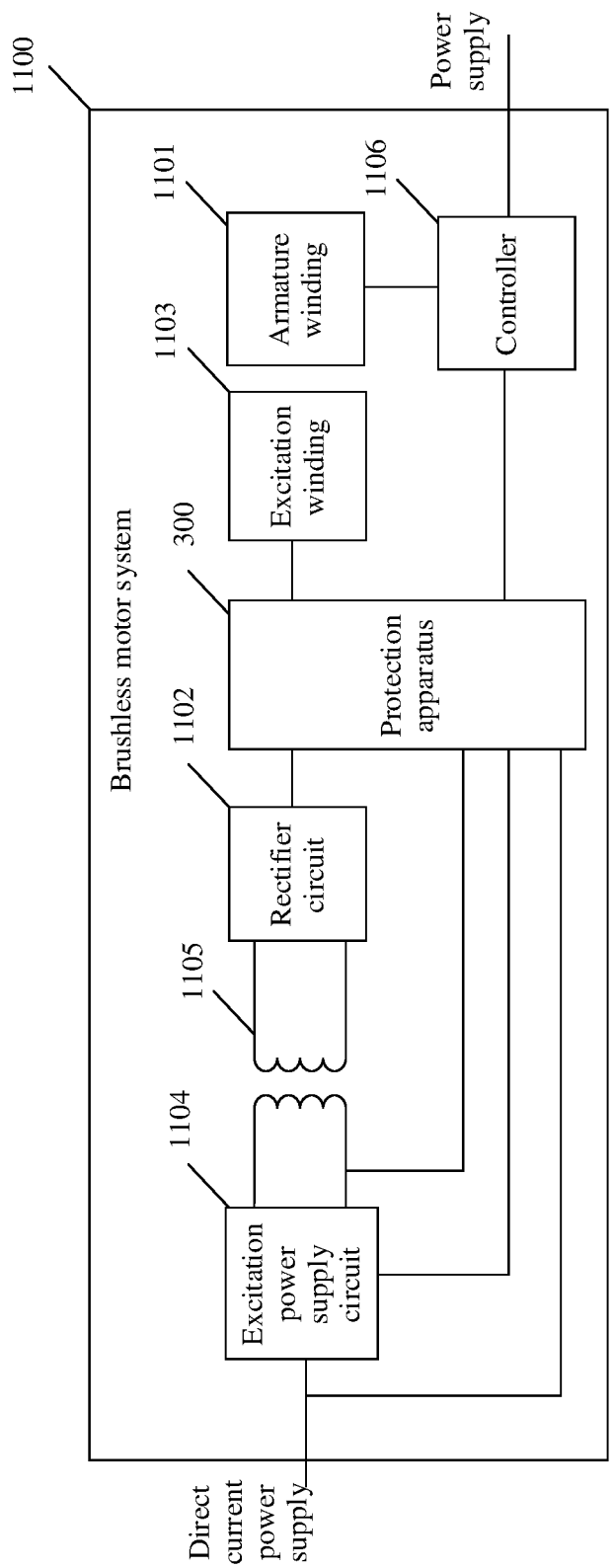
FIG. 11 is a schematic diagram of a structure of a brushless motor system according to an embodiment of this disclosure.

Certainly, the foregoing descriptions of the structure of the protection apparatus are merely examples. During actual application, the protection apparatus provided in this disclosure may further include another circuit structure based on different components of the protection apparatus and the demagnetization apparatus. Based on a same inventive concept, an embodiment of this disclosure provides a brushless motor system. As shown in FIG. 11, the brushless motor system 1100 may include: an armature winding 1101, a rectifier circuit 1102, an excitation winding 1103, an excitation power supply circuit 1104, a transformer 1105, a controller 1106, and the foregoing protection apparatus 300.

An input terminal of the excitation power supply circuit 1104 is configured to connect to a direct current power supply. An output terminal of the excitation power supply circuit 1104 is connected to a primary side 2 of the transformer 1105.

A secondary side of the transformer 1105 is connected to an input terminal of the rectifier circuit 1102.

The protection apparatus 300 is separately connected to the rectifier circuit 1102, the excitation winding 1103, the excitation power supply circuit 1104, and the controller 1106.

The armature winding 1101 is connected to the controller 1106.

The controller 1106 is configured to connect to a power supply.

Optionally, the transformer 1105 may be a rotary transformer. The secondary side of the transformer 1105, an excitation winding, and a rectifier circuit are placed in a rotatable area in the brushless motor system 1100.

The excitation power supply circuit 1104 receives a voltage output by the direct current power supply, converts the voltage into an alternating current voltage for power supply of the excitation winding 1103, and then outputs the alternating current voltage to the rectifier circuit 1102 by using the transformer 1105. The rectifier circuit 1102 converts the received alternating current voltage into a direct current voltage, and then directly outputs the direct current voltage to supply power to the excitation winding 1103. The controller 1106 is configured to control power supply for the armature winding 1101. The armature winding 1101 generates a rotating magnetic field to drive the excitation winding 1103 to rotate. In this way, the brushless motor system 1100 operates.

Optionally, the power supply may be a direct current power supply or an alternating current power supply. When the power supply is a direct current power supply, a controller converts a direct current voltage output by the direct current power supply into an alternating current power supply, and then outputs the alternating current power supply to the armature winding. When the power supply is an alternating current power supply, the controller 1106 directly provides a voltage output by the alternating current power supply to the armature winding.

It is clearly that, a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

It should be understood that a system structure and a service scenario provided in embodiments of this disclosure are mainly intended to explain some possible implementations of the technical solutions in this disclosure, and should not be construed as a unique limitation on the technical solutions in this disclosure. A person of ordinary skill in the art may learn that, as a system evolves and an updated service scenario emerges, the technical solutions provided in this disclosure are still applicable to same or similar technical problems.

What is claimed is:

1. A protection apparatus for use in a brushless motor system, wherein the brushless motor system comprises the protection apparatus, an armature winding, a controller, a rectifier circuit, an excitation winding connected to the rectifier circuit, an excitation power supply circuit, and a transformer connected between the rectifier circuit and the excitation power supply circuit; the protection apparatus comprising: a demagnetization apparatus and a control apparatus, wherein
    the demagnetization apparatus is configured to be bridged between the rectifier circuit and the excitation winding, and is configured to consume, when the brushless motor system is faulty, excess electric energy generated on the excitation winding; and
    the control apparatus is configured to separately connect to the excitation power supply circuit and the controller; and is configured to detect electrical parameters of an input terminal and an output terminal of the excitation power supply circuit, and when determining that the electrical parameters are outside of a threshold range, generate an alarm to the controller and adjust the output electrical parameter of the excitation power supply circuit.

2. The protection apparatus according to claim 1, wherein the control apparatus comprises a first sampling circuit, a second sampling circuit, and a control module, wherein
    a current input terminal of the first sampling circuit is configured to connect to the input terminal of the excitation power supply circuit and sample a current at the input terminal of the excitation power supply circuit, and two terminal points of a voltage input terminal of the first sampling circuit are configured to respectively connect to two terminal points of the input terminal of the excitation power supply circuit and sample a voltage between two terminals of the input terminal of the excitation power supply circuit;
    an input terminal of the second sampling circuit is configured to connect to the output terminal of the excitation power supply circuit and sample a current at the output terminal of the excitation power supply circuit; and
    the control module is separately connected to an output terminal of the first sampling circuit and an output terminal of the second sampling circuit; and the control module is configured to separately connect to the controller and a control terminal of the excitation power supply circuit, and is configured to receive a current and a voltage that are output by the first sampling circuit and the second sampling circuit, and when determining that the received current and voltage are outside of the threshold range, generate the alarm to the controller and adjust the output electrical parameter of the excitation power supply circuit.

3. The protection apparatus according to claim 2, wherein the first sampling circuit comprises a first current sensor and a first voltage sensor, wherein
    an input terminal of the first current sensor is configured to connect to the input terminal of the excitation power supply circuit, and an output terminal of the first current sensor is connected to the control module; and
    two terminal points of an input terminal of the first voltage sensor are configured to connect to the two terminals of the input terminal of the excitation power supply circuit, and an output terminal of the first voltage sensor is connected to the control module.

4. The protection apparatus according to claim 2, wherein the second sampling circuit comprises a second current sensor, wherein
an input terminal of the second current sensor is configured to connect to the output terminal of the excitation power supply circuit, and an output terminal of the second current sensor is connected to the control module.

5. The protection apparatus according to claim 1, wherein the demagnetization apparatus comprises an absorption circuit and a switch circuit, wherein
the absorption circuit is configured to connect to the excitation winding, and is configured to consume, when the brushless motor system is faulty, the excess electric energy generated on the excitation winding; and
the switch circuit is configured to separately connect to the rectifier circuit and the absorption circuit, and is configured to disconnect the rectifier circuit from the excitation winding when excess electric energy in a first direction is generated on the excitation winding, and reconnect the rectifier circuit to the excitation winding when the excess electric energy in the first direction is totally consumed.

6. The protection apparatus according to claim 5, wherein the absorption circuit comprises a first transient suppression diode.

7. The protection apparatus according to claim 5, wherein the switch circuit comprises a first switch, a first resistor, and a first capacitor, wherein
a first terminal of the first resistor is configured to separately connect to a first output terminal of the rectifier circuit and a first terminal of the absorption circuit, and a second terminal of the first resistor is separately connected to a first terminal of the first capacitor and a first terminal of the first switch;
a second terminal of the first capacitor is configured to connect to a second output terminal of the rectifier circuit; and
a second terminal of the first switch is configured to connect to a second terminal of the absorption circuit, and a first control terminal of the first switch is connected to the second terminal of the first capacitor.

8. The protection apparatus according to claim 7, wherein the switch circuit further comprises a voltage stabilizing diode, wherein
a cathode of the voltage stabilizing diode is connected to the first terminal of the first capacitor, and a second terminal of the voltage stabilizing diode is connected to the second terminal of the first capacitor.

9. The protection apparatus according to claim 7, wherein the switch circuit further comprises a switch auxiliary circuit, wherein the switch auxiliary circuit is connected to the switch circuit, and the switch auxiliary circuit is configured to control a turn-on moment and a turn-off moment of the switch circuit.

10. The protection apparatus according to claim 9, wherein the switch auxiliary circuit comprises a second switch, a second resistor, a first diode, and a second capacitor, wherein
a first terminal of the second switch is connected to the second terminal of the first resistor, and a second terminal of the second switch is connected to the second terminal of the first capacitor;
an anode of the first diode is connected to the second terminal of the second switch, and a cathode of the first diode is separately connected to a first terminal of the second capacitor and a second control terminal of the second switch;
a second terminal of the second capacitor is connected to a first terminal of the second resistor; and
a second terminal of the second resistor is connected to the second terminal of the absorption circuit.

11. The protection apparatus according to claim 10, wherein when the rectifier circuit comprises a rectifier bridge, the demagnetization apparatus further comprises a second transient suppression diode, wherein
a first terminal of the second transient suppression diode is configured to connect to a first output terminal of the rectifier circuit, and a second terminal of the second transient suppression diode is configured to connect to the second output terminal of the rectifier circuit.

12. The protection apparatus according to claim 10, wherein the switch auxiliary circuit further comprises a third transient suppression diode, wherein
a first terminal of the third transient suppression diode is connected to the second terminal of the second resistor, and a second terminal of the third transient suppression diode is connected to the second terminal of the absorption circuit.

13. The protection apparatus according to claim 1, wherein the demagnetization apparatus comprises an absorption circuit that is configured to connect to the excitation winding and is configured to consume, when the brushless motor system is faulty, the excess electric energy generated on the excitation winding.

14. The protection apparatus according to claim 1, wherein the demagnetization apparatus comprises a switch circuit that is configured to separately connect to the rectifier circuit and is configured to disconnect the rectifier circuit from the excitation winding when excess electric energy in a first direction is generated on the excitation winding, and reconnect the rectifier circuit to the excitation winding when the excess electric energy in the first direction is totally consumed.

15. A brushless motor system comprising: an armature winding, a rectifier circuit, an excitation winding, an excitation power supply circuit, a transformer, a controller, and a protection apparatus, wherein
an input terminal of the excitation power supply circuit is configured to connect to a direct current power supply, and an output terminal of the excitation power supply circuit is connected to a primary side of the transformer;
a secondary side of the transformer is connected to an input terminal of the rectifier circuit;
the protection apparatus is separately connected to the rectifier circuit, the excitation winding, the excitation power supply circuit, and the controller; and
the armature winding is connected to the controller;
wherein the protection apparatus comprises a demagnetization apparatus and a control apparatus, wherein
the demagnetization apparatus is configured to be bridged between the rectifier circuit and the excitation winding, and is configured to consume, when the brushless motor system is faulty, excess electric energy generated on the excitation winding; and
the control apparatus is configured to separately connect to the excitation power supply circuit and the controller; and is configured to detect electrical parameters of an input terminal and an output terminal of the excitation power supply circuit, and when determining that the electrical parameters are outside of a threshold range, generate an alarm to the controller and adjust the output electrical parameter of the excitation power supply circuit.

16. The brushless motor system according to claim 15, wherein the controller is configured to connect to a power supply.

17. The brushless motor system according to claim 15, wherein the demagnetization apparatus comprises an absorption circuit and a switch circuit, wherein the absorption circuit is configured to connect to the excitation winding, and is configured to consume, when the brushless motor system is faulty, the excess electric energy generated on the excitation winding; and the switch circuit is configured to separately connect to the rectifier circuit and the absorption circuit, and is configured to disconnect the rectifier circuit from the excitation winding when excess electric energy in a first direction is generated on the excitation winding, and reconnect the rectifier circuit to the excitation winding when the excess electric energy in the first direction is totally consumed.

18. The brushless motor system according to claim 17, wherein the absorption circuit comprises a first transient suppression diode.

19. The brushless motor system according to claim 17, wherein the switch circuit comprises a first switch, a first resistor, and a first capacitor, wherein a first terminal of the first resistor is configured to separately connect to a first output terminal of the rectifier circuit and a first terminal of the absorption circuit, and a second terminal of the first resistor is separately connected to a first terminal of the first capacitor and a first terminal of the first switch;

a second terminal of the first capacitor is configured to connect to a second output terminal of the rectifier circuit; and a second terminal of the first switch is configured to connect to a second terminal of the absorption circuit, and a first control terminal of the first switch is connected to the second terminal of the first capacitor.

* * * * *